: 3,723,311
INERT LOW-SOLIDS DRILLING FLUID
James L. Lummus, Tulsa, and Carl D. Edwards, Broken Arrow, Okla., assignors to Amoco Production Company, Tulsa, Okla.
No Drawing. Continuation-in-part of abandoned application Ser. No. 778,813, Nov. 25, 1968. This application Mar. 17, 1971, Ser. No. 125,374
Claims priority, application Canada, July 4, 1969, 56,163; Great Britain, July 29, 1969, 38,101/69; Netherlands, Aug. 29, 1969, 6913278
Int. Cl. C10m 1/06, 3/14
U.S. Cl. 252—8.5 A                      12 Claims

ABSTRACT OF THE DISCLOSURE

A drilling fluid composition includes water, flaxseed gum, gilsonite, asbestos, and a stabilizing agent, such as ethoxylated nonyl phenol, or ethoxylated polypropylene glycol. The water can be fresh or salty. The drilling fluid can be substantially clay-free. It may contain oil, a preservative, such as paraformaldehyde, and other additives, such as starch, if desired.

---

This application is a continuation-in-part of application Ser. No. 778,813 filed on Nov. 25, 1968, now abandoned.

For several years, finely ground asbestos has been added to drilling fluids to help sweep the bit cuttings out of wells during drilling operation, as suggested in U.S. Pats. 2,727,001, Rowe, and 2,732,343, Rowe. Gilsonite has been added to drilling fluids to give better stability of well walls, to lubricate the drill string in a well, to seal microfractures and thus prevent the formation of larger fractures and to decrease the loss of filtrate to formations at high temperatures, as suggested in reference, such as U.S. Pats. 2,316,968, Miller, 2,597,085, Larsen, and 3,041,275, Lummus et al. It has been found that these additives perform their most desirable functions about equally well in salt water or in fresh water. This has led to the hope that a substantially clay-free aqueous drilling fluid, insensitive to salt content, might be developed using these two ingredients as a base. Even a combination of these two additives presents many problems of stability of gilsonite dispersions in water and the provision of good drilling fluid properties. Solution of these problems should provide a drilling fluid stable to salt and shale and usable in a method for stabilizing the walls of wells drilled through salt and sloughing shale formations. Such a substantially clay-free drilling fluid should permit high drilling rates.

An object of this invention is to provide a stable aqueous drilling fluid which includes asbestos and gilsonite or other asphalts and has viscosity, yield value, gel strength and fluid loss properties within limits considered important in other drilling fluids. Another object is to provide a substantially clay-free aqueous drilling fluid, the properties of which do not change substantially with variations in salt content. A more specific object is to provide a stabilizing agent which prevents separation of gilsonite from aqueous suspensions thereof even in the presence of oil. Another specific object is to provide a dry mix which can be added to fresh or salt water together with a stabilizing agent to form a substantially clay-free, low-solids drilling fluid with good properties. Still another object is to provide a method of drilling wells through salt, sloughing shale, or both, by use of a drilling fluid stable to both, and which stabilizes the walls of the well drilled through both.

We have now found that our objects can be accomplished by using two other ingredients with asbestos and gilsonite. One of these is the gum from flaxseed meal. Flaxseed meal is sometimes called linseed cake, or flaxmeal. If the asbestos, gilsonite, and flaxseed meal gum are mixed into either fresh or salt water, and the properties are immediately measured, these properties are quite good. As a practical matter, however, the resulting composition is unacceptable since at least some of the solid ingredients tend to separate from the liquid upon standing. When oil is added, as it frequently is in drilling fluids, the problem becomes even worse because of the tendency of the oil-wetted gilsonite to ball up. The usual dispersing agents and emulsifying agents used with drilling fluids have been ineffective to overcome these problems. Only two types of agents have been found to be effective for forming a stable dispersion. The preferred agent is an ethoxylated alkyl phenol containing a very limited amount of ethylene oxide. For example, ethoxylated nonyl phenol containing from about 3 to 6 mols of ethylene oxide per mol of nonyl phenol may be used. The reaction product of 4 mols of ethylene oxide with 1 mol of nonyl phenol works very well and is the best agent known at this time.

The asbestos and gilsonite are readily available in the oil field for use in well drilling operations. They should be used in the ordinary recommended concentration ranges of from about 0.5 to about 5 pounds per barrel of drilling fluid for the asbestos, and from about 1 to about 20 pounds per barrel for the gilsonite. Preferred amounts are from about 1 to 3 pounds per barrel and from about 3 to 8 pounds per barrel for the asbestos and gilsonite, respectively.

The amount of flaxseed gum to give the desired low temperature fluid loss, gel strength, and viscosity properties should ordinarily range from about 0.3 to about 4 pounds per barrel of drilling fluid. As explained later, it is generally preferred to add the flaxseed meal rather than the pre-extracted gum. If the metal is used, the amount should be from about 2 to about 20 pounds per barrel and preferably from about 5 to about 12 pounds per barrel. In all the concentration values given above and below, the barrel contains 42 U.S. gallons.

Flaxseed meal is usually ground so substantially all particles pass through a No. 20 U.S. standard sieve and at least about 90 percent by weight are retained on a No. 100 U.S. standard sieve. Preferably, the meal is used in this raw, ground form. Actually, of course, the important ingredient of the flaxseed meal is the natural gum contained in the material. Once the gum has been dispersed in the drilling fluid, the solid residue of ground flaxseed hulls and pulp can be removed without harmful effects. Immediately after adding the flaxmeal, it is advisable to bypass the shale shaker until the flaxmeal has circulated through the well for at least a short time, such as about 15 minutes. In this time, the gum from the meal disperses into the drilling fluid. Then, when the mud is run through the shale shaker again, much of the solid flaxseed hulls are removed from the drilling fluid by the shale shaker leaving only the gum in the drilling fluid.

From about 0.05 to about 1.0 pound per barrel of the stabilizing agent should be used. From about 0.10 to about 0.25 pound per barrel is the preferred concentration range. Less effective agents, such as those prepared by ethoxylating octyl phenol or dodecyl phenol, or those containing more or less than about 4 mols of ethylene oxide per mol of alkyl phenol should, of course, be used in somewhat higher concentrations. The stabilizing agent is more convenient to handle as a solution in kerosene. It also seems to be somewhat more effective in diluted form, probably because the lower concentration (preferably about 20 percent) is not so likely to overtreat some of the gilsonite and undertreat the rest.

Flaxseed gum is a natural organic gum and is subject to fermentation. Therefore, from about 0.1 to about 0.5 pound and preferably about 0.2 pound per barrel of a preservative, such as paraformaldehyde or sodium pentachloro phenate should be added to the drilling fluid. Flaxmeal gum is not as readily fermented as many gums, however, so it can be used for at least short times without a preservative.

Still another ingredient which may be used is oil, such as kerosene, diesel oil, crude petroleum, or the like. The amount of oil may vary from none at all up to about 15 or even 20 percent of the total volume of the drilling fluid. Preferably, the amount of oil should be from about 2 to about 5 percent by volume of the drilling fluid, if it is used at all. It should be noted that due to the lubricating action of the gilsonite, there is much less need for oil in our drilling fluid than in others, which do not include an asphalt.

this range, but high drilling fluid viscosities may result. As shown in Table II, asphalts derived as residues from petroleum refining and having lower softening points can also be used at lower temperatures. Since gilsonite and the other natural asphalts with higher softening points are effective at both low and high temperatures, however, these natural asphaltic minerals are preferred.

In the tests shown in Table II, drilling fluids were produced containing 10 pounds of flaxseed meal, 5 pounds of the asphalt, 2 pounds of finely ground asbestos, 1 pound of the reaction product of 5 mols of ethylene oxide with 1 mol of nonyl phenol, and 0.2 pound of paraformaldehyde per barrel of drilling fluid. The composition also contained about 4 percent by volume of oil. When salt water was used as the base liquid, this was prepared by saturating fresh water with sodium chloride.

TABLE II

| | | | Mud Properties | | | | |
| | | | Plastic viscosity, centipoises | Yield value, lb./100 ft.$^2$ | Gel strengths, lb./100 ft.$^2$ | | Fluid loss, cc./30 min. |
| Test | Asphalt | Water | | | 10 sec. | 10 min. | |
| --- | --- | --- | --- | --- | --- | --- | --- |
| 1 | Gilsonite | Fresh | 8 | 4 | 1 | 1 | 8 |
| 2 | Soltex | do | 13 | 6 | 1 | 3 | 7 |
| 3 | Protecto Magic | do | 10 | 5 | 1 | 1 | 9 |
| 4 | Gilsonite | Salt | 14 | 2 | 1 | 2 | 9 |
| 5 | Soltex | do | 12 | 6 | 3 | 3 | 7 |
| 6 | Protecto Magic | do | 10 | 15 | 3 | 4 | 6 |

The above description of ingredients and concentrations is summarized in Table I.

TABLE I

| | Concentration, lb./bbl. | |
| Ingredient | General range | Preferred |
| --- | --- | --- |
| Flaxseed meal | 2 to 20 | 5 to 12. |
| Ground gilsonite | 1 to 20 | 3 to 8. |
| Ground asbestos | 0.5 to 5 | 1 to 3. |
| Stabilizing agent | 0.05 to 1 | 0.1 to 0.25. |
| Preservative | 0 to 0.5 | 0.2. |
| Oil | 0 to 20 [1] | 2 to 5.[1] |

[1] These values are percent by volume rather than pounds per barrel.

The characteristics and possible alternates or equivalents of each ingredient should now be considered in more detail. There are no equivalents for the gum from flaxseed meal. For some purposes, starch and guar gum are similar, but, as noted in U.S. Pat. 3,360,461 Anderson et al., drilling fluids containing flaxseed meal are quite different from those containing starch or guar gum in the presence of large amounts of drilled solids.

Other natural asphaltic minerals, such as elaterite, manjac, glance pitch and grahamite, are substantially equivalent to gilsonite if they have approximately the same softening point and are ground until they have about the same screen analysis. In this connection, the asphaltic mineral should have a softening point of at least about 250° F. and should be ground to pass a No. 80 sieve but be at least about 90 percent retained on a No. 325 sieve in the U.S. standard fine sieve series. Some of the particles can, of course, be above this range if desired, but these will be less effective. More than 10 percent can also be below Soltex is the trademark for a mixture of high molecular weight hydrocarbons and water-soluble constituents. Protecto Magic is the trademark for a cutback oxidized asphalt. The data in Table II show that either can be used in place of gilsonite at least at low temperatures.

The asbestos ordinarily available in the oil field is rather finely ground to provide some fluid loss control as well as gel strength. Asbestos with longer fibers can also be used. The longer fibers provide greater gel strength and less fluid loss reduction, as shown in Table III. In these tests, the compositions contained the ingredients listed in connection with the tests reported in Table II.

TABLE III

| | | | Plastic viscosity, centipoises | Yield value, lb./100 ft.$^2$ | Gel strengths, lb./100 ft.$^2$ | | Fluid loss, cc./30 min. |
| Test | Asbestos | Water | | | 10 sec. | 10 min. | |
| --- | --- | --- | --- | --- | --- | --- | --- |
| 1 | Visbestos | Fresh | 8 | 4 | 1 | 1 | 8 |
| 2 | 3F | do | 13 | 19 | 3 | 3.5 | 12 |
| 3 | 4K | do | 14 | 14 | 2 | 3 | 13 |
| 4 | Visbestos | Salt | 14 | 2 | 1 | 2 | 9 |
| 5 | 3F | do | 18 | 19 | 5 | 6 | 19 |
| 6 | 4K | do | 13 | 34 | 9 | 10 | 17 |

In Table III, Visbestos is the trademark for asbestos ground so that at least about 90 percent passes a No. 80 U.S. standard sieve in a wet screening test. The 3F grade of asbestos contains some fibers at least ½ inch long. The 4K grade includes fibers at least ¼ inch long. Obviously, if the main purpose is fluid loss reduction, the finely ground product is best. If gel strength is the principal requirement, however, the longer fibers are best. If both fluid loss reduction and gel strength increase are desired, a mixture can be used.

The most critical ingredient is the stabilizing agent. This is variously referred to as an emulsifying agent, a dispersing agent, or a wetting agent. Which of these functions is most important is not certain. The results in Table IV show, however, that most of the better known emulsifying, dispersing, and wetting agents do not provide the required action. In the tests reported in Table IV, the compositions contain the ingredients listed in connection with tests reported in Table II.

TABLE IV

| Test | Stabilizing agent Type | Lb./bbl. | Water | Oil, percent | Results |
|---|---|---|---|---|---|
| 1 | Sorbitan monostearate | 1.0 | Fresh | 4 | Gilsonite floated. |
| 2 | do | 1.0 | Salt | 4 | Do. |
| 3 | Ethoxylated nonyl phenol A Ethoxylated fatty acid | 0.5 0.5 | Fresh | 4 | Do. |
| 4 | Ethoxylated nonyl phenol B | 1.0 | Fresh | 4 | Do. |
| 5 | do | 1.0 | Salt | 4 | Stable. |
| 6 | Ethoxylated nonyl phenol C | 1.0 | Fresh | 4 | Gilsonite floated. |
| 7 | do | 1.0 | Salt | 4 | Clear water on bottom. |
| 8 | Amine salt dodecyl benzene sulfonic acid | 1.0 | Fresh | 4 | Temporarily stable. |
| 9 | do | 1.0 | Salt | 4 | Do. |
| 10 | Alkanol amine salt of alkyl aryl sulfonic acid. | 1.0 | Fresh | 4 | Do. |
| 11 | Alkanol amine salt of alkyl aryl sulfonic acid. | 1.0 | Salt | 4 | Do. |
| 12 | Ethoxylated lauryl aclohol A | 1.0 | Fresh | 4 | Gilsonite floated. |
| 13 | do | 1.0 | Salt | 4 | Clear water on bottom. |
| 14 | Ethoxylated isooctyl phenol | 1.0 | do | None | Temporarily stable. |
| 15 | Ethoxylated nonyl phenol D | 1.0 | do | None | Slight separation. |
| 16 | Ethoxylated polypropylene glycol A | 1.0 | do | None | Water separated. |
| 17 | Ethoxylated sorbitan monooleate | 1.0 | do | None | Do. |
| 18 | Ethoxylated nonyl phenol B | 1.0 | do | None | Do. |
| 19 | Ethoxylated nonyl phenol E | 1.0 | do | 4 | Separated. |
| 20 | Ethoxylated octyl phenol | 1.0 | do | 4 | Do. |
| 21 | Sorbitan monolaurate | 1.0 | do | 4 | Temporarily stable. |
| 22 | Ethoxylated sorbitan tristearate | 1.0 | do | 4 | Do. |
| 23 | Ethoxylated propoxylated ethylene diamine. | 1.0 | do | 4 | Separated. |
| 24 | Sorbitan monooleate | 1.0 | Fresh | 4 | Gilsonite floated. |
| 25 | Ethoxylated lauryl alcohol B | 1.0 | do | 4 | Do. |
| 26 | Ethoxylated polypropylene glycol B | 1.0 | do | 4 | Do. |
| 27 | Ethoxylated polypropylene glycol C | 1.0 | do | 4 | Stable. |
| 28 | Ethoxylated polypropylene glycol D | 1.0 | do | 4 | Slight separation. |
| 29 | Ethoxylated polypropylene glycol C | 1.0 | Salt | 4 | Stable. |
| 30 | Ethoxylated polypropylene glycol D | 1.0 | do | 4 | Slight separation. |
| 31 | Ethoxylated nonyl phenol F | 0.25 | Fresh | 4 | Stable. |
| 32 | do | 0.25 | Salt | 4 | Do. |
| 33 | Ethoxylated nonyl phenol G | 0.25 | Fresh | 4 | Gilsonite floated. |
| 34 | do | 0.25 | Salt | 4 | Stable. |
| 35 | Ethoxylated nonyl phenol H | 0.25 | Fresh | 4 | Gilsonite floated. |
| 36 | do | 0.25 | Salt | 4 | Stable. |

In addition to the stabilizing agents reported in Table IV, 17 others of unknown composition were tested. A few of these formed temporarily stable compositions, particularly in the absence of oil. Even the best of these agents of unknown composition were not sufficiently effective for commercial use. A brief study of Table IV shows that only two types of agents were effective. One type is the ethoxylated nonyl phenols. The other type is the ethoxylated polypropylene glycols. Obviously, not all members of these two groups are satisfactory.

Further study of the ethoxylated nonyl phenols indicated that those forming sufficiently stable compositions contained from about 3 to about 6 mols of ethylene oxide per mole of nonyl phenol. One agent containing about 5 mols of ethylene oxide per mol of nonyl phenol has been successfuly used in field tests of the composition. Another agent containing 4 mols ethylene oxide per mol of nonyl phenol has also been successfully field tested. Other ethoxylated alkyl phenols ranging from octyl phenol to dodecyl phenol can also be used but the ethoxylated nonyl phenols are preferred.

The ethoxylated polypropylene glycols should be based on polypropylene glycols having a molecular weight of at least about 1,700 and preferably about 2,200. An upper limit of about 3,500 in molecular weight should be observed to avoid solubility difficulties. The ethoxylated polypropylene glycols should contain from about 8 to about 13 percent ethylene oxide, the higher percent ethylene oxide being used with the higher molecular weight polypropylene glycols. Preferably, the amount of ethylene oxide should be about 10 percent of the total weight of the agent.

The three major ingredients, the flaxseed meal, the asbestos, and the gilsonite can be added separately to water to form the drilling fluid. In order to insure an optimum ratio, however, it is greatly preferred that these three materials be pre-mixed in the desired ratio and then dispersed into the water as a single mixed additive. The preservative should also be added to this mix. Referring back to Table I, it will be apparent that this mixture should contain from about 2 to about 20 parts of flaxseed meal, from about 1 to about 20 parts of gilsonite, and from about 0.5 to about 5 parts of asbestos, all parts being by weight. The actual composition tested most extensively in the laboratory and the field has contained 10 parts of flaxseed meal, 5 parts of gilsonite, and 2 parts of asbestos. This mixture may be first dispersed in the water, oil then being added, and finally the stabilizing agent. Frequently, the pH is adjusted by the addition of sodium hydroxide. This is for several purposes, such as to decrease corrosion, increase the rate of dispersion of the flaxseed gum into the water, and also to help decrease bacterial attack on the flaxseed gum. For best results, the pH should be at least about 7. It is sometimes best to add the dry mixture and the stabilizing agent substantially simultaneously to avoid any tendency for the solid particles to separate from the water. This is particularly true when oil is present and when a high concentration of the mix is to be used.

A dry mix was made up as just described and various concentrations were tested with the results reported in Table V. In this particular mix, the stabilizing agent was added to the dry mix before it was dispersed into the water. The stabilizing agent was used in a concentration of 1 pound of agent in each 72 pounds of other ingredients. Since this provided in some cases a very low concentration of stabilizing agent, these concentrations are also shown in Table V.

TABLE V

| Test | Lb./bbl. Mix | Lb./bbl. Stabilizer | Water | Plastic viscosity, centipoises | Yield value, lb./100 ft.[2] | Gel strengths, lb./100 ft.[2] 10 sec. | Gel strengths, lb./100 ft.[2] 10 min. | Fluid loss, cc./30 min. |
|---|---|---|---|---|---|---|---|---|
| 1 | 10.0 | .14 | Fresh | 5 | 2 | 0 | 1 | 10.2 |
| 2 | 5.0 | .07 | Salt | 5 | 3 | 1 | 2 | 14.5 |
| 3 | 5.0 | .07 | Fresh | 3 | 0 | 0 | 1 | 20.4 |
| 4 | 7.5 | .10 | do | 5 | 1 | 0 | 4 | 16.0 |
| 5 | 10.0 | .14 | do | 7 | 1 | 1 | 3 | 12.2 |
| 6 | 12.5 | .17 | do | 9 | 2 | 1 | 4 | 12.6 |
| 7 | 15.0 | .21 | do | 7 | 3 | 1 | 3 | 11.2 |
| 8 | 5.0 | .07 | Salt | 5 | 3 | 1 | | 130 |
| 9 | | [1] .075 | | | | | | 21.0 |
| 10 | 7.5 | .10 | Salt | 7 | 2 | 1 | 5 | 79.0 |
| 11 | 10.0 | .14 | do | 9 | 2 | 2 | 4 | 18.6 |
| 12 | 12.5 | .17 | do | 8 | 5 | 2 | 4 | 13.0 |
| 13 | 15.0 | .21 | do | 10 | 6 | 6 | 4 | 10.4 |

[1] Added and mud remixed.

In Table V, it will be noted that tests 1 and 2 are apparently duplicates of tests 5 and 8, respectively. The difference is that tests 1 and 2 were made immediately after the drilling fluids were prepared. Tests 3 through 13 were made on drilling fluids which were prepared, allowed to stand for three days, re-stirred, and then tested. The composition in both test 8 and test 10 had separated to some extent after standing, the gilsonite and some of the other ingredients floating on top. Upon re-stirring after aging, the solids on top were not very well dispersed in the water, resulting in high fluid loss values. In test 9, the composition in test 8 was re-stirred with an additional 0.075 pound per barrel of stabilizing agent. The result was a greatly improved dispersion and correspondingly greatly reduced fluid loss. From these results, it is apparent that the concentration of stabilizing agent should be at least about 0.1 pound per barrel, particularly in salt water, although as little as 0.05 pound per barrel provides sufficient stabilizing action under some conditions. With regard to aging effects, some drilling fluid samples with high stabilizing agent concentrations have been stored for two months with little change in properties.

The tests in Table V show that as little as 5 pounds of the mix per barrel of drilling fluid can be used to provide at least fair drilling fluid properties in salt water. In fresh water, however, at least about 10 pounds per barrel of the mix should be used.

Fluid loss control at high temperatures also depends on the concentration of the mix. In Table VI, the results of fluid loss tests run at various elevated temperatures are shown. The mix used in these tests was the same as that described in connection with Table V.

TABLE VI

| Test | Lb./bbl. mix | Water | Fluid loss, cc./30 min. 100° F. | 150° F. | 200° F. |
|---|---|---|---|---|---|
| 1 | 10.0 | Fresh | 32 | 37 | 60 |
| 2 | 12.5 | do | 30 | 33 | 38 |
| 3 | 7.5 | Salt | 180 | 400 | 200 |
| 4 | 10.0 | do | 40 | 300 | 200 |
| 5 | 15.0 | do | 22 | 34 | 37 |

It will be apparent from the results reported in Table VI that 12.5 pounds per barrel of the mix in fresh water and 15 pounds per barrel in salt water give good fluid loss reduction up to a temperature of at least about 200° F. The lower fluid loss rates at 200° F. than at 150° F. in tests 3 and 4 may be due to a slight softening of the gilsonite and, therefore, a better sealing action at 200° F. Whatever the explanation of tests 3 and 4, it is obvious from tests 2 and 5 that if enough of the mix is used, the drilling fluid retains its fluid loss control properties at high temperatures.

In some cases, it is necessary to add a weighting agent, such as barite, to a drilling fluid to increase the density of the drilling fluid. To test the ability of our drilling fluid to suspend weighting agents, drilling fluid samples were prepared from the mix described in connection with Table V. The results of the tests are presented in Table VII.

TABLE VII

| Test | Lb./bbl. mix | Water | Lb./bbl barite[1] | Stability | Plastic viscosity | Yield value | Gel strength 10 sec. | Gel strength 10 min. | Fluid loss |
|---|---|---|---|---|---|---|---|---|---|
| 1 | 10 | Fresh | 230 | Barite settled | | | | | |
| 2 | 15 | do | 230 | Stable | 15 | 7 | 4 | 9 | 10.8 |
| 3 | 5 | Salt | 140 | Barite settled | | | | | |
| 4 | 10 | do | 140 | Stable | 17 | 5 | 4 | 5 | 12.5 |

[1] Amount added to 1 barrel of unweighted drilling fluid to produce a density of 12.0 lb./gal.

The reason more barite was used with fresh water than with salt water was that the density of the salt water was higher to start with than the density of the fresh water. It is obvious from Table VII that the drilling fluid can be made to support solid weighting agents such as barite. The resulting suspension has acceptable drilling fluid properties.

When the drilling fluid contains salt, there is less concern regarding the effects of hydratable shale bit cuttings on the properties of the drilling fluid. The salt usually prevents any significant amount of hydration and dispersion of the shale cuttings. With fresh water muds, however, there is frequently a considerable degree of hydration and dispersion of shale bit cuttings. To check the degree of hydration and dispersion of shale cuttings in our drilling fluid, a drilling fluid sample was prepared using a dry mix like that described in connection with Table V but containing no stabilizing agent. The drilling fluid was prepared using fresh water with 10 pounds per barrel of the mix, 0.25 pound per barrel of the stabilizer then being added. An extra 1 pound per barrel of asbestos was also added to increase the gel strength and decrease the fluid loss of the drilling fluid. This batch of drilling fluid was a large one and was mixed by passing it through a homogenizer. After measuring the properties, 30 pounds of fine shale (through a No. 140 U.S. standard sieve) were added per barrel of drilling fluid. The mixture was then stirred for an hour and the properties were again measured. Results are given in Table VIII.

TABLE VIII

| Test | Shale, lb./bbl. | Plastic viscosity, centipoises | Yield value, lb./100 ft.[2] | Gel strength, lb./100 ft.[2] 10 sec. | Gel strength, lb./100 ft.[2] 10 min. | Fluid loss, cc./30 min. |
|---|---|---|---|---|---|---|
| 1 | None | 6 | 2.5 | 2 | 2 | 20 |
| 2 | 30 | 6 | 5 | 2 | 2 | 21 |

A comparison of the original properties of the drilling fluid to those after stirring the drilling fluid for an hour with finely divided shale shows some increase in yield value but the other properties are remarkably unchanged. Gilsonite has been used in the past to stabilize the walls of wells drilled through shales. Apparently, the gilsonite can prevent hydration of the shale. We have also noted similar tendencies of the gum from flaxseed meal. The combined action of the gilsonite and the flaxseed meal seems to substantially completely prevent hydration and dispersion of shale even in fresh water.

some extra stabilizer available so it can be added separately when needed.

Tests showing the effects of adding high concentrations of oil and two different types of asbestos are shown in Table X.

TABLE X

| Test | Water | Diesel oil, percent | Mix, lb./bbl. | Stabilizer, lb./bbl. | Plastic viscosity | Yield value | Gel strengths 10 sec. | Gel strengths 10 min. | Fluid loss | Density, lb./gal. |
|---|---|---|---|---|---|---|---|---|---|---|
| 1 | Fresh | 10 | 10 | [1] 0.5 | 5 | 1 | 1 | 1 | 18 | 7.8 |
| 2 | do | 20 | 10 | 0.5 | 5 | 1 | 1 | 1 | 14 | 7.7 |
| 3 | Salt | 10 | 5 | 0.25 | 4 | 3 | 1 | 1 | 23 | 9.2 |
| 4 | do | 20 | 5 | 0.25 | 4 | 3 | 1 | 1 | 28 | 9.0 |
| 1 lb./bbl. fine asbestos added to each of Tests 1 to 4 | | | | | | | | | | |
| 5 | Fresh | 10 | 10 | 0.5 | 6 | 1 | 1 | 1 | 18 | |
| 6 | do | 20 | 10 | 0.5 | 6 | 1 | 1 | 1 | 14 | |
| 7 | Salt | 10 | 5 | 0.25 | 4 | 7 | 3 | 3 | 23 | |
| 8 | do | 20 | 5 | 0.25 | 4 | 5 | 2 | 2 | 26 | |
| 1 lb./bbl. asbestos with ¼ inch fibers added to each of Tests 1 to 4 | | | | | | | | | | |
| 9 | Fresh | 10 | 10 | 0.5 | 4 | 6 | 2 | 2 | 18 | |
| 10 | do | 20 | 10 | 0.5 | 4 | 6 | 2 | 2 | 15 | |
| 11 | Salt | 10 | 5 | 0.25 | 6 | 9 | 4 | 5 | 38 | |
| 12 | do | 20 | 5 | 0.25 | 6 | 8 | 4 | 5 | 37 | |

[1] 0.25 lb./bbl. stabilizer was not enough to stabilize the fresh water muds containing 10 and 20 percent oil.

One additional advantageous property of the drilling fluid should be mentioned. When flaxseed gum is added to water flowing in a pipe, the pressure drop is decreased. This property of the flaxseed gum is at least partially overcome by the asbestos and gilsonite in the drilling fluid. The result is that the drilling fluid can be circulated in the well substantially as easily as water in spite of the much greater viscosity and gel strength of the drilling fluid.

Table IX shows the effects of omitting some of the ingredients of the drilling fluid. For this purpose, a drilling fluid was prepared by mixing into fresh water 10 pounds per barrel of the dry mix described in connection with Table VIII. This mix contained no stabilizer.

TABLE IX

| Test | Stabilizer, lb./bbl. | Oil, percent by volume | NaOH, lb./bbl. | Plastic viscosity | Yield value | Gel strengths 10 sec. | Gel strengths 10 min. | Fluid loss |
|---|---|---|---|---|---|---|---|---|
| 1 | 0 | 0 | 0 | 4 | 1 | 1 | 1 | 25 |
| 2 | 0.25 | 4 | 0 | 4 | 1 | 1 | 1 | 19 |
| 3 | 0.25 | 4 | 0.1 | 3 | 1.5 | 1 | 1 | 14 |
| 4 [1] | 0.25 | 4 | 0 | 5 | 4 | 2 | 2 | 16.8 |

[1] Contained an extra 1 lb./bbl. asbestos.

The first test in Table IX shows that the mix with no stabilizer, oil or caustic soda, had acceptable properties except for as lightly high fluid loss. Adding the stabilizer and oil did not change the properties except for the lower fluid loss value which usually results from adding oil to the drilling fluid. The further reduction in fluid loss upon adding caustic soda is thought to be due to the better extraction of flaxmeal gum from the flaxseed meal by the more alkaline water. Test 4 simply demonstrates how the yield value and gel strength can be controlled by the addition of a little extra asbestos. The concentration of asbestos in the mixture of dry ingredients is usually rather low, additional asbestos being carried at the drilling rig for addition to the mud as needed for control of yield value, gel strengths, and fluid loss.

As noted in connection with Tables V and IX, it is possible to prepare a drilling fluid with good properties which contains no stabilizer. As a practical matter, however, the stabilizer is necessary, particularly if oil is present to prevent the adverse effects of allowing the mud to stand for a few hours. Therefore, in spite of the data in Tables V and IX, the stabilizer is an essential ingredient of our drilling fluid for commercial use.

The stabilizer is usually carried separately on the rig floor and is added separately to the drilling fluid. Although at least part of the stabilizer can be added to the dry mix, it has been found convenient to add it separately. Particularly, when fresh water and high oil concentrations are used, more stabilizer must be used than is required for salt water muds. Therefore, it is necessary to have at least It will be noted in Table X that additional stabilizer was necessary in some of the drilling fluids to obtain the desired degree of stability. Additional asbestos, preferably of the long fiber variety, was needed to give more adequate gel strength in the presence of the high concentrations of oil. The low densities shown in Table X are the main reason for adding the high concentrations of oil. Drilling fluids which are prepared using saturated salt water frequently have densities of about 9.5 pounds per gallon. In same areas, such densities contribute to lost circulation problems. It is obvious that our drilling fluid can tolerate sufficient oil to reduce this density considerably. It is also obvious that with high concentrations of oil the salt water drilling fluid has somewhat better properties than the fresh water drilling fluid.

The usual drilling fluid additives other than oil may or may not have an effect on the properties of our drilling fluid, depending on the nature of the additive. It will be noted that no clay is necessary in preparing our drilling fluid. Due to the presence of the flaxseed meal gum and the gilsonite and sometimes salt water, there is little tendency for drilled clays to disperse in the drilling fluid. Drilled shales and clays are removed by the shale shaker or by desilters. Therefore, mud additives, such as the phosphates, lime, soda ash, and the like, which change drilling fluid properties by acting on the clays which may be present, produce little, if any, effects in our drilling fluid. Other additives, such as starch, which do not depend on the clay for their action, are as effective in our drilling fluid as in others and may be used. For exampe, small amounts of starch can be used to reduce the fluid loss.

Even bentonite can be added, if desired, in some cases. The substantial freedom from clay is not a necessary requirement of our drilling fluid. The important point is that good drilling fluid properties are provided without the use of clays. Therefore, it is possible to prepare a drilling fluid permitting much higher drilling rates because of the absence of clay solids. Some clays will usually be present, either as colloidally dispersed material in fresh water or as large particles, such as fluocculated clays in salt water, or partially disintegrated shale bit cuttings in both fresh and salt water. When reference is made to a substantially clay-free aqueous drilling fluid, it will be understood that it is not intended to exclude drilling fluids having a few percent of such clays. When the term "consisting essentially of" is used herein, it is intended to include not only those materials named but also other materials, such as starch, bit cuttings, clays, weighting agents, and the like, in amounts which do not substantially adversely affect the properties of the drilling fluid. In fact, we contemplate the use of clays in an oil-free system in combination with asphalt (gilsonite) and stabilizers of the type taught herein. In systems of the latter type the asphalt and stabilizers are present in the same concentrations as generally disclosed herein for oil-containing systems.

The test results reported in the tables were all obtained by the standard equipment and method described in API Recommended Practice 13B, 1st Ed., November 1962, entitled "Standard Procedure for Testing Drilling Fluids," issued by American Petroleum Institute, Division of Production, Dallas, Tex.

A large batch of a mix was manufactured containing about 10 parts of flaxseed meal, 5 parts of gilsonite, and 2 parts of finely ground asbestos, all parts being by weight. This mix was used to drill a well in Yoakum County in West Texas. In this area, there was considerable trouble with high chloride and calcium contamination. In spite of the salt contamination, there was also considerable trouble with sloughing shales, particularly during trips to change bits. The trouble was especially pronounced at depths between about 9,000 and about 12,000 feet.

At about 8,800 feet, 110 sacks of our mix (50 pounds per sack) were added to a little less than 1,000 barrels of water to prepare a drilling fluid for use through the troublesome section of the well. Stabilizer and a little oil were also added. The shale shaker was bypassed for about two circulations of the composition to permit extraction of the flaxseed gum before the hulls and pulp were screened out by the shale shaker.

Make-up mix was added at the rate of about 30 or 40 sacks per day. Finely ground asbestos was added occasionally at a rate of about 2-to-5 50-pound sacks per day but sometimes for several days no additional asbestos was required. Caustic soda was used at a rate of about 100-to-300 pounds per day to keep the pH above about 7. Stabilizer was added at a rate between about 2 and about 10 gallons per day of a 20-percent solution in kerosene. This stabilizer was the reaction product of 5 mols of ethylene oxide and 1 mol of nonyl phenol. The mud properties were easily controlled. With a few exceptions, the plastic viscosity remained between 5 and 9 centipoises. The yield value ran between 4 and 7. The 10-second gel was 2-to-4. The 10-minute gel was 4-to-6 pounds per 100 square feet, and the fluid loss varied between about 10 and about 25 milliliters per 30 minutes. At one point, about ½ pound per barrel of starch was added to obtain a lower fluid loss of about 8 milliliters. There was a temporary increase in yield value and gel strength when the starch was added but these increases quickly disappeared.

The chloride content ran from about 80,000 parts per million at a depth of about 9,000 feet to about 40,000 parts per million near total depth of about 11,800. Total hardness (calcium and magnesium) ran about 1,500 parts per million near the start. This checks with analyses of muds from other wells in the area which have run from about 3,000 to about 800 parts per million total hardness. Obviously, our drilling fluid was able to withstand considerable chloride and divalent metal ion contamination and still maintain good properties.

There was little evidence of sloughing. The bit cuttings on the shale shaker had the appearance of not even being water-wet. They certainly were not badly disintegrated. In adjoining wells, large volumes of water had to be added to the mud to keep the drilled solids content down. When our drilling fluid was used, however, very little water was needed since so little of the drilled solids became dispersed in the drilling fluid. After the well was drilled to total depth, a caliper log showed that this well was much closer to gauge diameter than surrounding wells in which shale sloughing problems had occurred.

Since these was no added bentonite, and the drilled clay and shale did not disperse, little clay was present to reduce the drilling rate. Unfortunately this well passed through a fault, so only a short depth interval drilled with our drilling fluid was strictly comparable to offset wells. For this short interval, however, there was a definite increase in drilling rate.

It will be obvious from the above description that we have accomplished the objects of our invention. A dry mix has been provided which can be used with a stabilizing agent for forming a substantially clay-free aqueous drilling fluid with good properties. The drilling fluid properties are substantially unaffected by salt and drilled shale. The walls of wells drilled through sloughing shales are stabilized. Even the walls of wells drilled through salt can be stabilized by using substantnially salt-saturated water to prepare the drilling fluid. Because of the very low concentration of colloidal solids, higher drilling rates are possible.

There are many variations to the ideas described above. For example, the flaxmeal gum can be extracted from the flaxseed meal, the gum then being used to prepare the drilling fluid instead of the flaxseed meal. In preparing a dry mix, at least part of the stabilizer can be added to the dry mix. One of the principal variations is use of the stabilizer with gilsonite, particularly in the presence of oil in drilling fluids which do not contain flaxseed meal, asbestos, or both. It has been found that the limited class of stabilizing agents is also uniquely effective in stabilizing gilsonite in these other aqueous muds, as well as in our substantially clay-free drilling fluid.

Still other variations will occur to those skilled in the art from the above description. Therefore, we do not wish to be limited to the examples described above, but only by the following claims.

We claim:

1. A drilling fluid composition for drilling wells, said composition consisting essentially of water and the following ingredients:

| Ingredient | Amount |
| --- | --- |
| Flaxseed gum | 0.3 to 4 pounds per barrel of drilling fluid. |
| Ground asphalt | 1 to 20 pounds per barrel of drilling fluid. |
| Ground asbestos | 0.5 to 5 pounds per barrel of drilling fluid. |
| Stabilizing agent | 0.05 to 1 pound per barrel of drilling fluid. |
| Preservative for flaxseed gum | 0 to 0.5 pound per barrel of drilling fluid. |
| Oil | 0 to 20 percent by volume of drilling fluid. |
| Water-soluble salt | 0 to saturation. | said stabilizing agent being selected from the group consisting of (1) the reaction product of from about 3 to about 6 mols of ethylene oxide with one mol of an alkyl phenol in which the alkyl group contains from about 8 to about 12 carbon atoms, and (2) the reaction product of from about 8 to about 15 percent by weight of ethylene oxide with from about 85 to about 92 percent by weight of a polypropylene glycol having a molecular weight between about 1,700 and about 3,500, and said asphalt being ground so that it passes a No. 80 U.S. standard sieve and at least about 90 percent is retained on a No. 325 U.S. standard sieve.

2. The composition of claim 1 in which said flaxseed gum is present in the form of flaxseed meal, the asphalt is gilsonite with a softening point of at least about 250° F., the asbestos is ground to pass a No. 80 U.S. standard sieve in a wet screening test, and said stabilizing agent is the reaction product of from 4 to 5 mols of ethylene oxide with one mol of nonyl phenol.

3. The composition of claim 2 in which the concentrations of the ingredients are as follows:

| | Pounds per barrel of drilling fluid |
|---|---|
| Flaxseed meal | 5 to 12 |
| Ground gilsonite | 3 to 8 |
| Ground asbestos | 1 to 3 |
| Ethoxylated nonyl phenol | 0.1 to 0.25 |

4. A dry mix of ingredients suitable for use with water for forming a substantially clay-free drilling fluid, said mix consisting essentially of the following ingredients:

| | Parts by weight |
|---|---|
| Flaxseed gum | 0.3 to 4 |
| Ground asphalt | 1 to 20 |
| Ground asbestos | 0.5 to 5 |
| Stabilizing agent | 0.05 to 1 |
| Preservative for flaxseed gum | 0 to 0.5 | said stabilizing agent being selected from the group consisting of (1) the reaction product of from about 3 to about 6 mols of ethylene oxide with one mol of an alkyl phenol in which the alkyl group contains from about 8 to about 12 carbon atoms, and (2) the reaction product of from about 8 to about 15 percent by weight of ethylene oxide with from about 85 to about 92 percent by weight of a polypropylene glycol having a molecular weight between about 1,700 and about 3,500, and said asphalt being ground so that it passes a No. 800 U.S. standard sieve and at least about 90 percent is retained on a No. 325 U.S. standard sieve.

5. The composition of claim 4 in which said flaxseed gum is present in the form of flaxseed meal, the asphalt is gilsonite with a softening point of at least about 250° F., and the asbestos is ground to pass a No. 80 U.S. standard sieve in a wet-screening test.

6. The composition of claim 5 in which the concentrations are as follows:

| | Parts by weight |
|---|---|
| Flaxseed meal | 5 to 12 |
| Ground gilsonite | 3 to 8 |
| Ground asbestos | 1 to 3 |

7. A method for drilling a well rapidly with a rotary bit comprising circulating past said bit, during the drilling operation, the substantially clay-free aqueous drilling fluid of claim 1, whereby a rapid drilling rate is obtained due to the substantial freedom of the drilling fluid from dispersed clay.

8. A method for drilling a well through shale-containing formations with a rotary bit comprising circulating in said well, during the drilling operation, the drilling fluid of claim 1, whereby the shale bit cuttings are removed from the well in substantially undisintegrated form due to the protective action of said drilling fluid.

9. A method for drilling a well through shale which sloughs into the well in the presence of water comprising circulating in said well past said shale, during the drilling operation, the drilling fluid of claim 1 whereby sloughing of the shale is reduced due to the protective action of said drilling fluid on said sloughing shale.

10. A method for drilling a well through a formation containing a water-soluble salt comprising circulating in said well, during the drilling operation, the composition of claim 1 in substantially saturated salt water, whereby good drilling fluid properties are maintained, but little salt in the formation is dissolved, thus stabilizing the salt-containing formation.

11. In a method for drilling a well in which an aqueous drilling fluid containing clay, but free from oil is circulated in the well during the drilling operation, and in which method an asphalt is added to said drilling fluid, said asphalt being ground so that it passes a No. 80 U.S. standard sieve and at least about 90 percent is retained on a No. 325 U.S. standard sieve, the improvement comprising including in said drilling fluid from about 0.05 to about 1.0 pound per barrel of a stabilizing agent selected from the group consisting of (1) the reaction product of from about 3 to about 6 mols of ethylene oxide with one mol of an alkyl phenol in which the alkyl group contains from about 8 to about 12 carbon atoms, and (2) the reaction product of from about 8 to about 15 percent by weight of ethylene oxide with from about 85 to about 92 percent by weight of a polypropylene glycol having a molecular weight between about 1,700 and about 3,500.

12. The method of claim 11 in which said asphalt is gilsonite and the stabilizing agent is the reaction product of from about 4 to 5 mols of ethylene oxide with 1 mol of nonyl phenol.

References Cited
UNITED STATES PATENTS

| | | | |
|---|---|---|---|
| 2,773,030 | 12/1956 | Tailleur | 252—8.5 |
| 3,310,125 | 3/1967 | Darley | 252—8.5 X |
| 3,322,668 | 5/1967 | Fontenot et al. | 252—8.5 |
| 3,385,789 | 5/1968 | King | 252—8.5 |
| 2,714,582 | 8/1955 | Day | 252—311.5 |
| 2,732,343 | 1/1956 | Rowe | 252—8.5 |
| 3,048,538 | 8/1962 | Rosenberg et al. | 252—8.5 |
| 3,360,461 | 12/1967 | Anderson et al. | 252—8.5 |
| 3,471,402 | 10/1969 | Shannon et al. | 252—8.5 |

HERBERT B. GUYNN, Primary Examiner

U.S. Cl. X.R.

252—8.5 C, 8.5 P